United States Patent
Severinsson et al.

(10) Patent No.: US 8,296,022 B2
(45) Date of Patent: Oct. 23, 2012

(54) TORQUE VECTORING DEVICE AND MEANS FOR ITS CONTROL

(75) Inventors: Lars Severinsson, Hishult (SE); Ola Nicklasson, Morarp (SE)

(73) Assignee: BorgWarner TorqTransfer Systems AB (SE)

( * ) Notice: Subject to any disclaimer, the term of this patent is extended or adjusted under 35 U.S.C. 154(b) by 0 days.

(21) Appl. No.: 12/904,811

(22) Filed: Oct. 14, 2010

(65) Prior Publication Data

US 2011/0087409 A1 Apr. 14, 2011

Related U.S. Application Data

(63) Continuation of application No. PCT/SE2009/050411, filed on Apr. 22, 2009.

(30) Foreign Application Priority Data

Apr. 24, 2008 (SE) ...................................... 0800946

(51) Int. Cl.
*G06F 7/00* (2006.01)
(52) U.S. Cl. .............................. 701/58; 701/51; 475/205
(58) Field of Classification Search .................... 701/51, 701/58; 475/86, 205; 180/233, 247, 248
See application file for complete search history.

(56) References Cited

U.S. PATENT DOCUMENTS

| 5,086,867 | A | 2/1992 | Hirota et al. | |
|---|---|---|---|---|
| 7,294,083 | B2* | 11/2007 | Bowen | 475/225 |
| 7,361,113 | B2* | 4/2008 | Puiu et al. | 475/221 |
| 7,503,416 | B2* | 3/2009 | Sharma et al. | 180/247 |
| 7,708,665 | B2* | 5/2010 | Wheals | 475/205 |
| 7,806,220 | B2* | 10/2010 | Sharma et al. | 180/247 |
| 2005/0261099 | A1* | 11/2005 | Bowen | 475/205 |
| 2006/0122024 | A1* | 6/2006 | Bowen | 475/205 |
| 2006/0157291 | A1* | 7/2006 | Puiu et al. | 180/247 |
| 2006/0162980 | A1* | 7/2006 | Bowen | 180/247 |
| 2006/0276292 | A1* | 12/2006 | Puiu | 475/205 |
| 2008/0242463 | A1* | 10/2008 | Yamada et al. | 475/5 |
| 2008/0287246 | A1 | 11/2008 | Sackl et al. | |
| 2009/0131210 | A1 | 5/2009 | Kassler | |
| 2009/0192006 | A1* | 7/2009 | Bock et al. | 475/205 |

(Continued)

FOREIGN PATENT DOCUMENTS

AT 8859 U1 1/2007

(Continued)

OTHER PUBLICATIONS

International Search Report and Written Opinion of the International Searching Authority; PCT/SE2009/050411; Jul. 9, 2009; 8 pages.

(Continued)

*Primary Examiner* — Helal A Algahaim
(74) *Attorney, Agent, or Firm* — St. Onge Steward Johnston & Reens LLC

(57) ABSTRACT

A torque vectoring device directs different torques at will to the two wheels of a drive axle on a road vehicle. It has two hydraulically controlled disc clutches, connected to a drive shaft, extending through the device, and in engaged condition intended for connecting the drive shaft to either of two gear sleeves, each in splines engagement with an eccentric tube eccentrically journaled in relation to the drive shaft, and a torque transmitting mechanism with a gear ratio of 1:1 between the eccentric tube and a differential case sleeve, coaxial with the drive shaft and forming part of a differential case of a differential on the drive axle, to which differential the torque vectoring device is connected.

16 Claims, 5 Drawing Sheets

U.S. PATENT DOCUMENTS

2009/0221393 A1 * 9/2009 Kassler .................. 475/205

FOREIGN PATENT DOCUMENTS

| DE | 102006008236 A1 | 1/2007 |
|---|---|---|
| GB | 2406178 A | 3/2005 |
| JP | 2008030651 A | 2/2008 |
| WO | 2006089334 A1 | 8/2006 |
| WO | 2007035977 A2 | 4/2007 |
| WO | 2007079956 A1 | 7/2007 |

OTHER PUBLICATIONS

European Search Report; Application No. EP 09 73 5331; Issued: May 27, 2011; 6 pages.

* cited by examiner

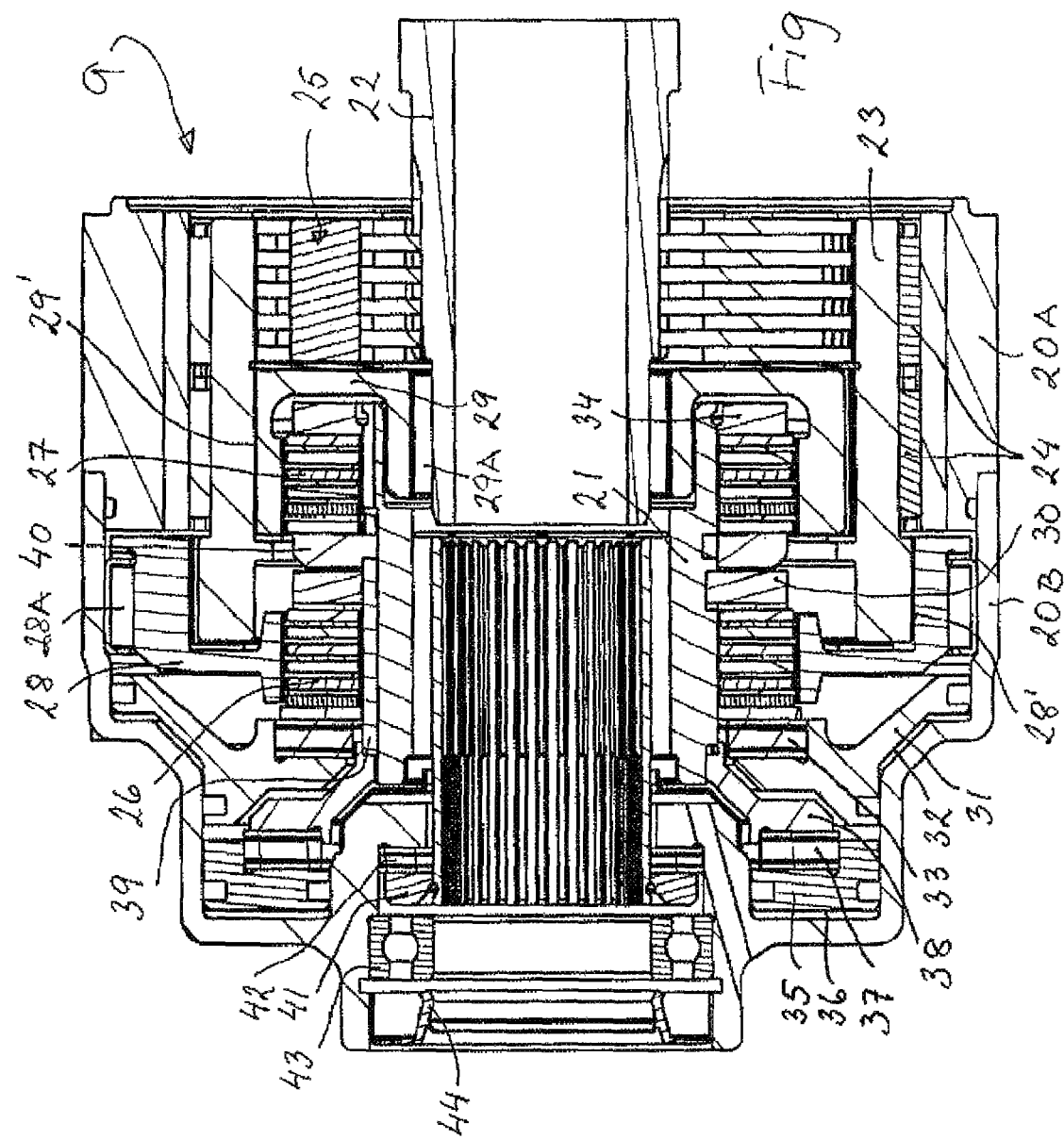

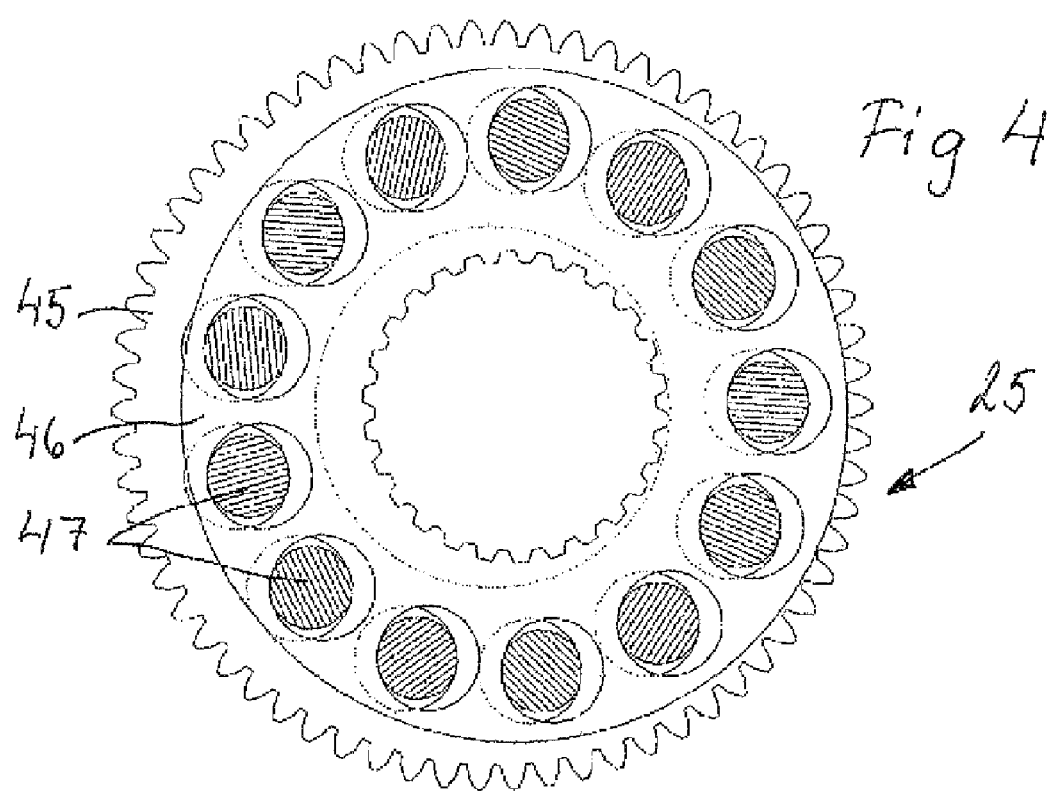

TORQUE VECTORING DEVICE AND MEANS FOR ITS CONTROL

CROSS-REFERENCE TO RELATED APPLICATIONS

The present application is a continuation of pending International patent application PCT/SE2009/050411 filed on Apr. 22, 2009 which designates the United States and claims priority from Swedish patent application 0800946-6 filed on Apr. 24, 2008, the content of which is incorporated herein by reference.

FIELD OF THE INVENTION

The present invention relates to a torque vectoring device for directing different torques at will to the two wheels of a drive axle on a road vehicle. It also relates to a method of regulating the driving dynamics of the vehicle by controlling the device, as well as a computer program and a device for carrying out the method.

BACKGROUND OF THE INVENTION

In a road vehicle, especially a car, it is advantageous to be able to freely distribute drive torque to different wheels in order to enhance the driving dynamics of the vehicle. Devices for accomplishing this desired result are in the art referred to as torque vectoring devices.

Torque vectoring devices may be used in either two-wheel drive vehicles or four-wheel drive vehicles, although the latter case must be regarded as more common. It can also be used for either rear or front drive shafts or in the cardan shaft for distributing torque between the front and rear drive shafts. In the present specification the example with the rear drive shaft of a four-wheel drive vehicle has been used. The torque is here distributed between the two wheels of a rear shaft provided with a conventional, central differential.

In order to obtain the desired result with regard to the driving dynamics, it may in certain situations be advantageous to provide a drive wheel with a positive torque in relation to the other drive wheel on the drive shaft. Such a positive torque may be obtained in a way known per se by a mechanical gear device for gearing-up or increasing the rotational speed of the drive shaft for the wheel in question by for example 10%.

Many examples of such mechanical gear devices are known. In a typical arrangement torque vectoring devices are arranged at either side of the central differential for the two drive shafts. A typical example is shown in WO2007/079956. The arrangement is both expensive and heavy. It is therefore advantageous to find solutions to the problem of having one torque vectoring device at one side of the differential for the two drive shafts.

The main object of the invention is to provide such a torque vectoring device which is as cheap and light-weight as possible without in any way impairing its reliability or effectiveness.

SUMMARY OF THE INVENTION

This is according to the invention attained by a torque vectoring device having two hydraulically controlled disc clutches, connected to a drive shaft, extending through the device, and in engaged condition intended for connecting the drive shaft to either of two gear sleeves, each in splines engagement with an eccentric tube eccentrically journaled in relation to the drive shaft, and a torque transmitting mechanism with a gear ratio of 1:1 between the eccentric tube and a differential case sleeve, coaxial with the drive shaft and forming part of a differential case of a differential on the drive axle, to which differential the torque vectoring device is connected.

Another aspect of the invention is a method of regulating the driving dynamics of a vehicle by controlling a torque distribution from a vehicle engine between a first shaft and a second shaft of the vehicle, the method involving:

receiving a plurality of input signals, each input signal representing a respective current driving characteristic for said vehicle;

analyzing one or more of said input signals so as to determine whether a change in the driving dynamics is required; and if it is determined that a change in the driving dynamics is required, controlling the aforementioned torque vectoring device to actuate any of said two hydraulically controlled disc clutches into its engaged condition.

Further aspects of the invention are an associated computer program product and an associated device for regulating the driving dynamics of a vehicle according to the attached independent claims.

BRIEF DESCRIPTION OF THE DRAWINGS

The invention will be described in further detail below under reference to the accompanying drawings, in which.

DETAILED DESCRIPTION OF THE INVENTION

Figure 1:
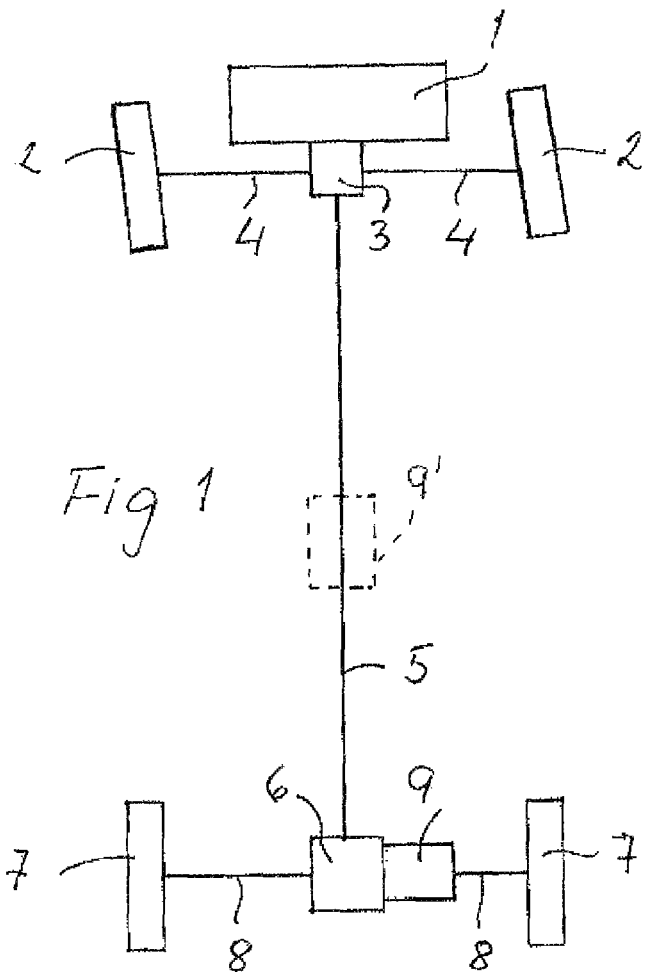
FIG. 1 is a very schematical layout of a four-wheel driven car with a torque vectoring device according to the invention.

FIG. 1 very schematically illustrates the layout of a four-wheel driven car. An engine 1 is drivingly connected to steerable front wheels 2 via a conventional differential 3 and front drive shafts 4. A cardan shaft 5 connects the engine 1 with a conventional rear differential 6 for distributing torque to rear wheels 7 via rear drive shafts 8. A torque vectoring device 9 to be described below is arranged at the rear differential 6.

Figure 2:
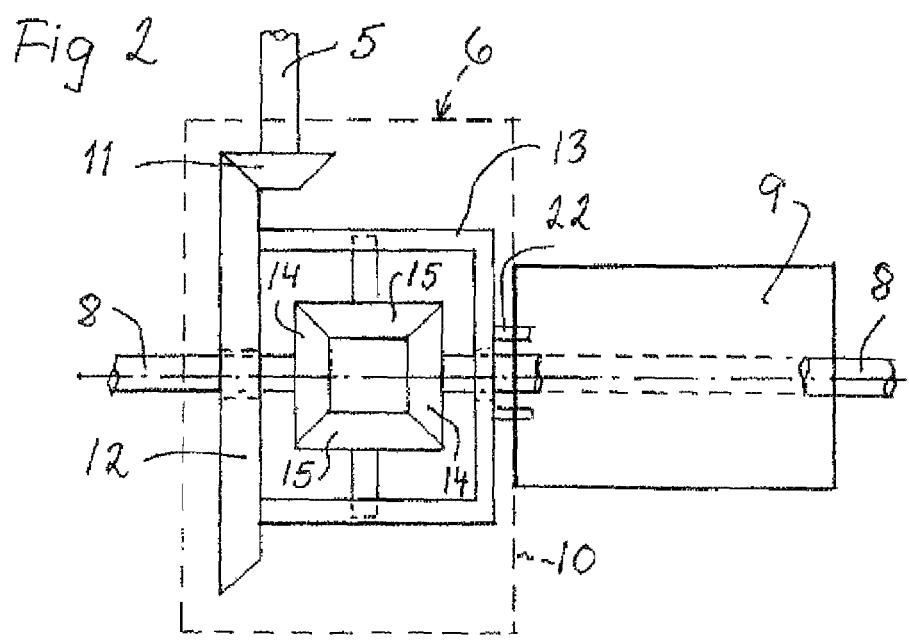
FIG. 2 is a schematical top view of the rear differential of the car with a torque vectoring device according to the invention.

FIG. 2 is a schematical illustration of the rear differential 6, the rear drive shafts 8, and the torque vectoring device 9. The differential 6 is encased by a fixed differential housing 10, shown in dashed lines. The cardan shaft 5 is provided with a pinion drive gear 11 in gear engagement with a crown wheel 12. The crown wheel 12 is attached to a differential case 13. The rear drive shafts 8 extend into the differential case 13 and are there provided with conical drive gears 14 in gear engagement with conical differential gears 15 rotatably journaled in the differential case 13. This design is well known for any person skilled in the art of car design. The differential may alternatively have another design.

The torque vectoring device 9 to be described below is attached to the differential housing 10 and a member 22 thereof is a part of the differential case 13, as will appear.

Figure 3:
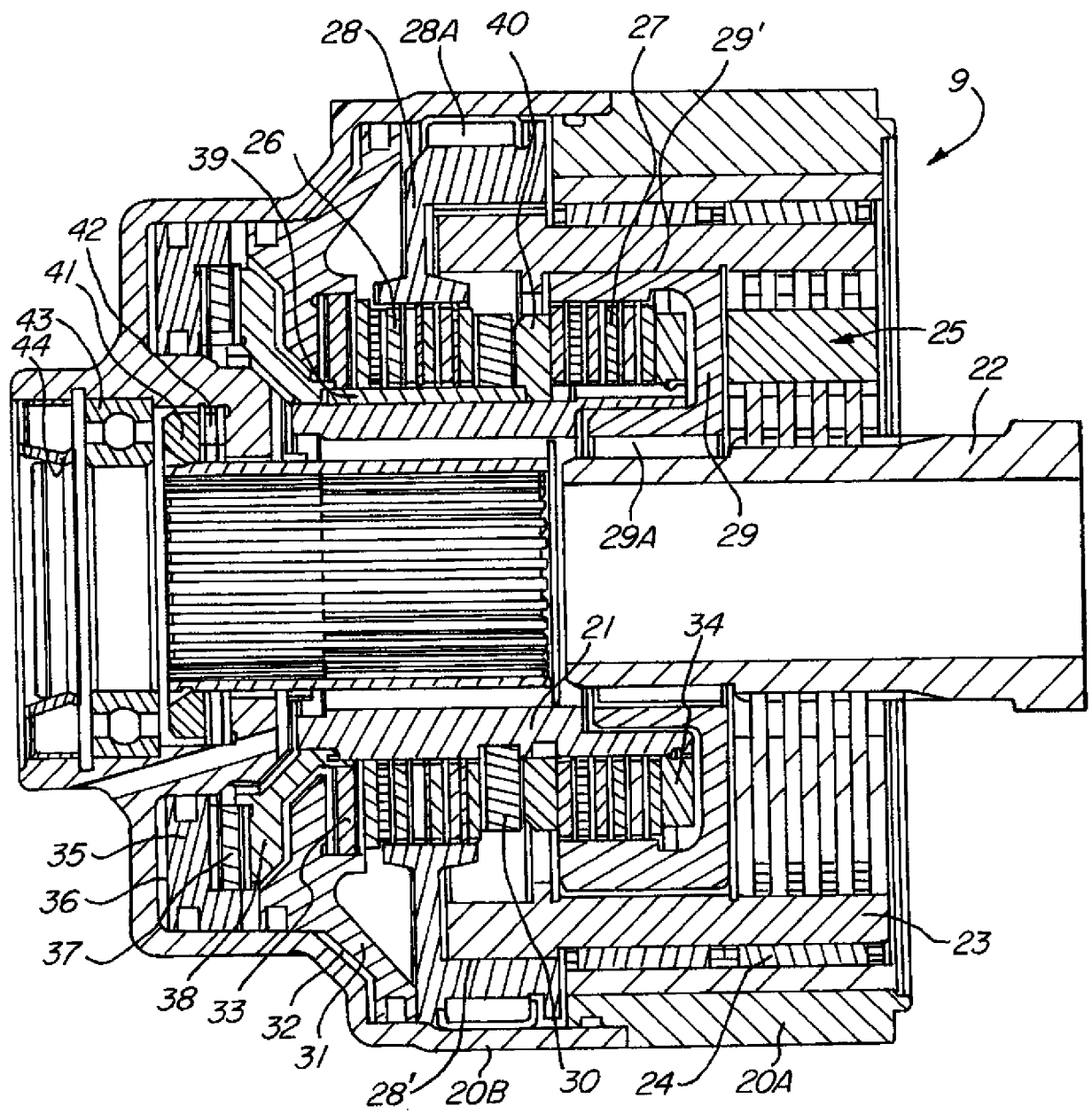
FIG. 3 is a sectional side view of a torque vectoring device according to the invention.

FIG. 3 is a section through the torque vectoring device 9 according to the invention. The device has a housing 20 preferably divided into two housing portions 20A and 20B. The housing 20 is to be attached to the differential housing 10 in a conventional, not shown manner.

The rear drive shaft 8 shown in FIG. 2 but not in FIG. 3 is to extend centrally through the device 9. It is to be attached to a central hub 21 by a splines engagement. It also extends without engagement through a differential case sleeve 22, which is to be attached to or constituting a part of the differential case 13 shown in FIG. 2.

An eccentric tube 23 is eccentrically journalled for rotation in the housing 20 by means of radial bearings 24, for example radial needle bearings. The eccentric tube 23 is eccentric in relation to and connected to the differential case sleeve 22 by means of a torque transmitting mechanism 25. This mechanism 25 will be further described below under reference to FIG. 4 and will impart the same rotational speed to the eccentric tube 23 as the rotational speed of the differential case sleeve 22.

Connected to the hub 21 are two disc clutch devices, called a disc clutch low 26 and a disc clutch high 27 to the left and to the right in FIG. 3, respectively. Each such clutch comprises a number of alternate discs connected on the one hand to the hub 21 and on the other hand to a gear sleeve low 28 and a gear sleeve high 29, respectively. The clutch discs are connected to the hub and to the respective gear sleeves for rotation therewith but with a possibility for axial movement and thereby for engagement with each other.

The gear sleeve low 28 is journaled in the housing 20 by means of a radial needle bearing 28A, whereas the gear sleeve high 29 is journaled on the differential case sleeve 22 by means of a radial needle bearing 29A.

The gear sleeve low 28 is provided with inner gear 28' for gear or splines engagement with a portion of corresponding outer gear on the eccentric tube 23. The gear sleeve high 29 is provided with outer gear 29' for gear or splines engagement with a portion of corresponding inner gear in the eccentric tube 23.

The disc clutch low 26 may be engaged by axial movement of its clutch discs against a reaction washer low 30 on the hub 21 by means of a piston low 31. The piston low 31 is axially movable in the housing 20 under the action of hydraulic fluid admitted to a cylinder space low 32 and can act on the clutch discs over an axial bearing low 33. Similarly, the disc clutch high 27 may be engaged by axial movement of its clutch discs against a reaction washer high 34 on the hub 21 by means of a piston high 35. The piston high 35 is axially movable in the housing 20 under the action of hydraulic fluid admitted to a cylinder space high 36 and can act on the clutch discs over a force transmitting chain consisting of an axial bearing high 37, a force transmitting ring 38, a force transmitting sleeve 39, and an engagement ring 40 axially movably arranged on the hub 21.

There is a reaction force ring 41 arranged at the left hand side of the hub 21, from which ring reaction forces may be transmitted to the housing 20 over a reaction force bearing 42.

The housing 20 is towards it left hand end provided with a radial bearing 43 for the not shown drive shaft 8 (FIG. 2) and with a sealing 44.

Figure 4:
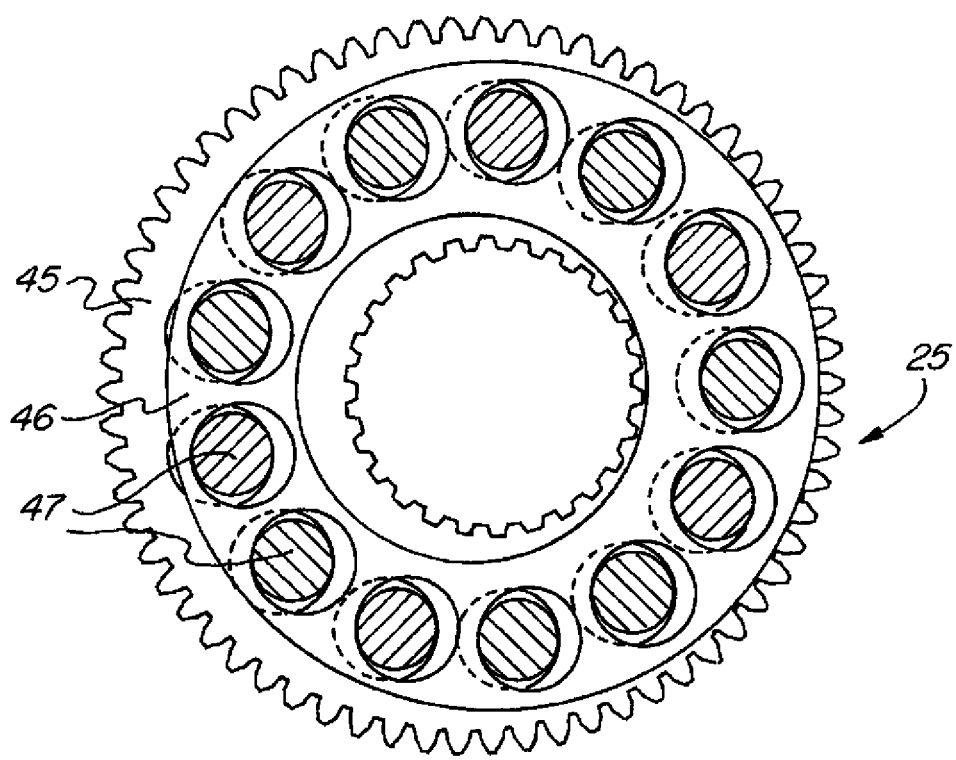
FIG. 4 is a transverse view of a torque transmitting mechanism to the right in FIG. 3.
Figure 5:
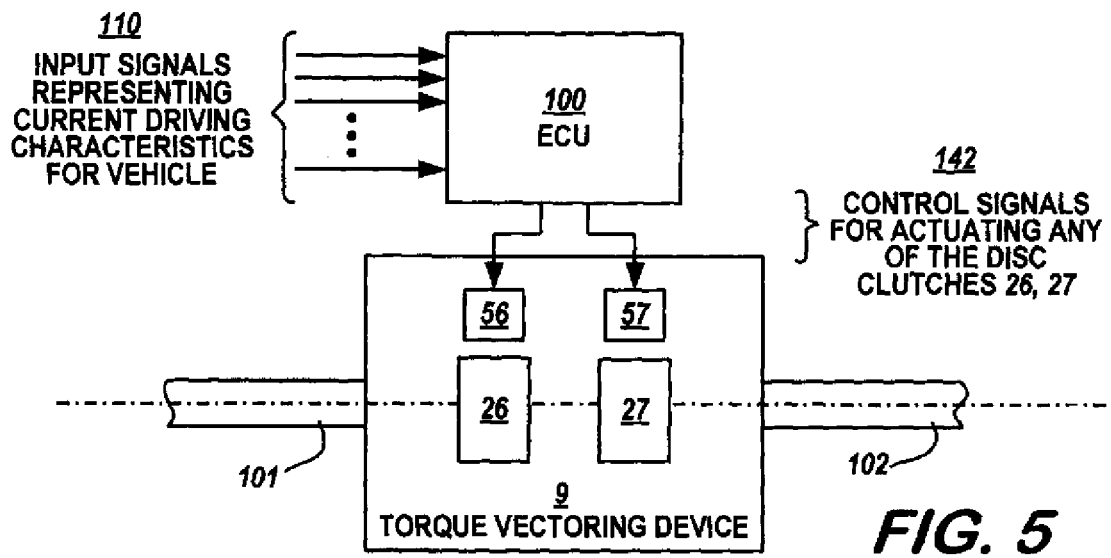
Figure 6:
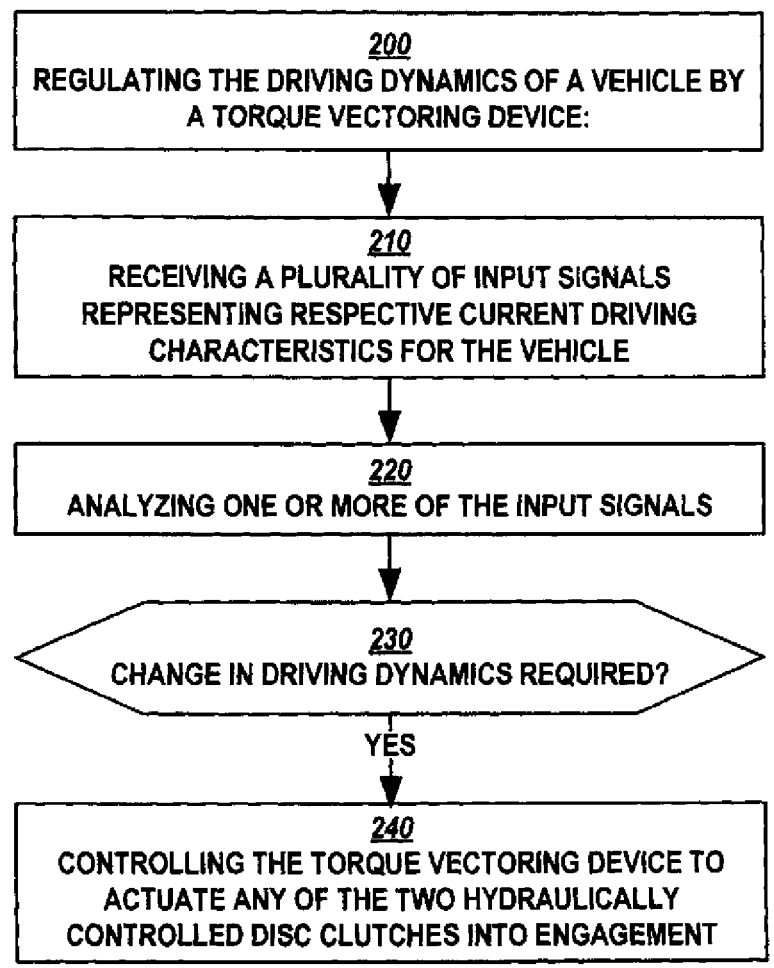
Figure 7:
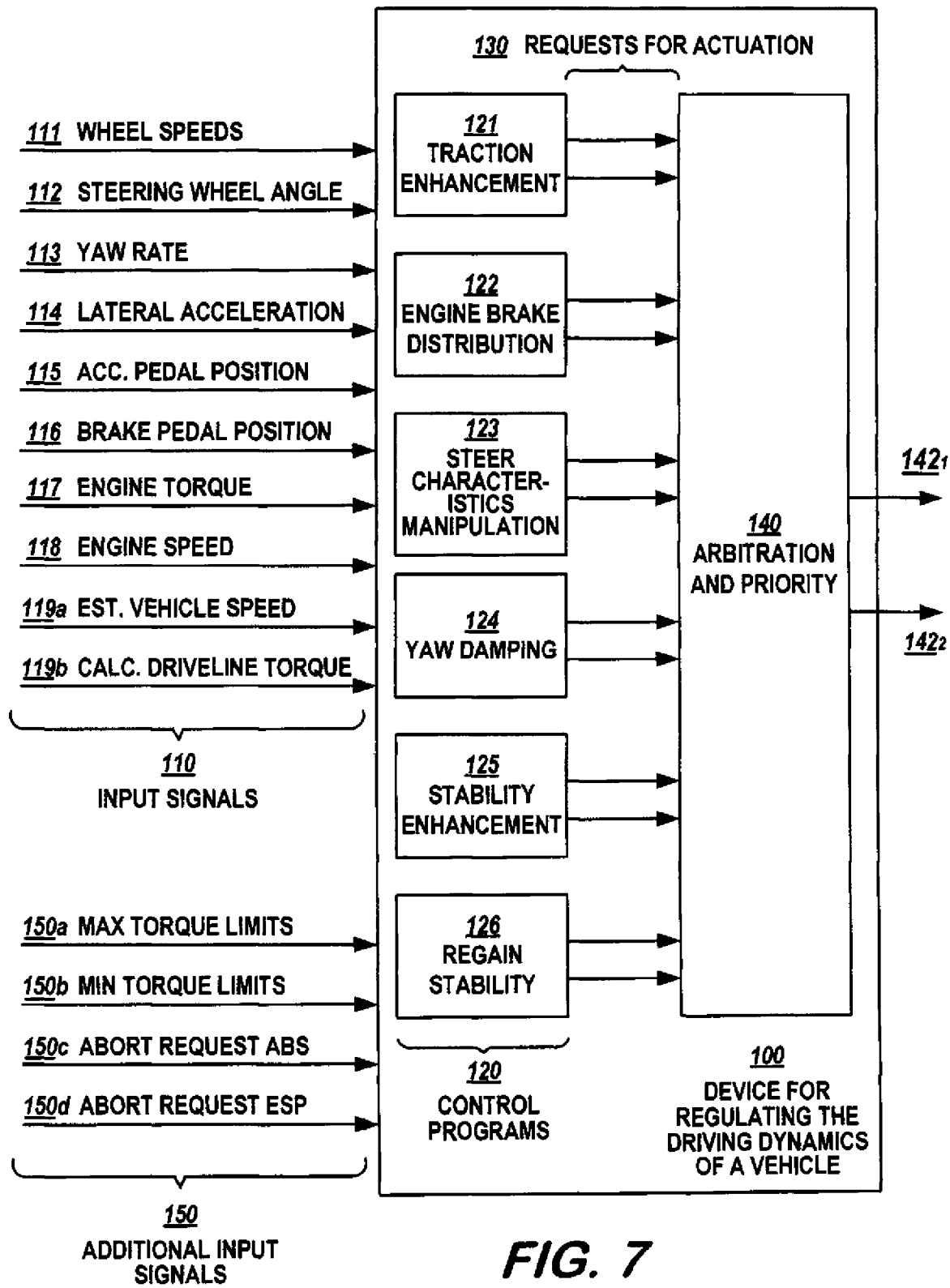

Reference is now made to FIG. 4 and the right hand part of FIG. 3, where a torque transmitting mechanism 25 is shown. This mechanism 25 comprises a number of alternate steel discs 45, 46 with holes, where axial pins 47 with smaller diameter than the holes are contained. Outer discs 45 are in outer gear engagement with inner gear teeth of the eccentric tube 23, whereas inner discs 46 are in inner gear engagement with outer gear teeth of the differential case sleeve 22. The mechanism 25 will impart the same rotational speed to the eccentric tube 23 as the rotational speed of the differential case sleeve 22.

With the shown and described device it will be possible to increase or decrease the rotational speed of the drive shaft 8 in comparison to the differential case sleeve 22. If the disc clutch high 27 is engaged, when the differential case sleeve 22 and the drive shaft 8 rotate, the rotational speed of the hub 21 will tend to increase with the chosen gear ratio, for example 1.1. Similarly, if the disc clutch low 26 is engaged, when the differential case sleeve 22 and the drive shaft 8 rotate, the rotational speed of the hub 21 will tend to decrease with the chosen gear ratio, for example 0.9.

A hydraulic system comprising a supply of hydraulic fluid, a pump, an accumulator, and appropriate valves is provided for supplying hydraulic fluid to the two cylinder spaces 32 and 36 for obtaining the desired characteristics of the device. The system is electrically controlled via appropriate software.

The torque transmitting mechanism 25 as shown and described may within the scope of the invention be replaced by a similar mechanism, achieving the same purpose of obtaining a gear ratio of 1:1.

A torque vectoring device according to the invention may be used in either two-wheel drive vehicles or four-wheel drive vehicles and in both cases either for the rear or the front driven axle(s). Also, as is indicated by the reference numeral 9' in FIG. 1, a torque vectoring device according to the invention may be used in a longitudinal arrangement in the cardan shaft 5, provided that the engine torque is supplied trough a differential to the torque vectoring device, which distributes torque to the front and rear drive axles.

A variation of the invention is to arrange a torque vectoring device, comprising a disc clutch, an inner gear device and a torque transmitting mechanism as shown and described in this specification, at either side of the differential.

Figure 5:
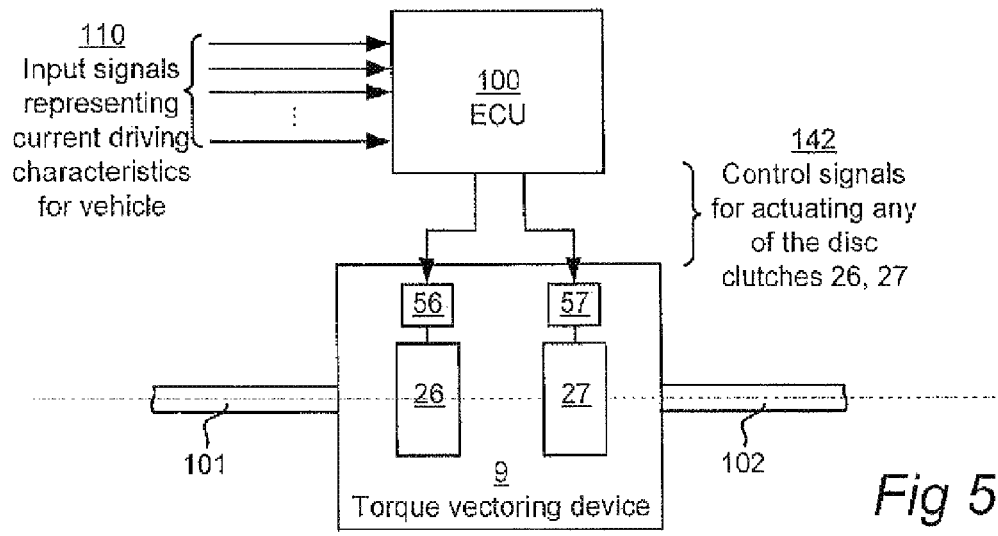
FIG. 5 is a block diagram illustrating, on a schematic level, how the torque vectoring device of FIGS. 1-4 can be controlled by a controller device, such as an electronic control unit (ECU), in order to regulate the driving dynamics of a vehicle.
Figure 6:
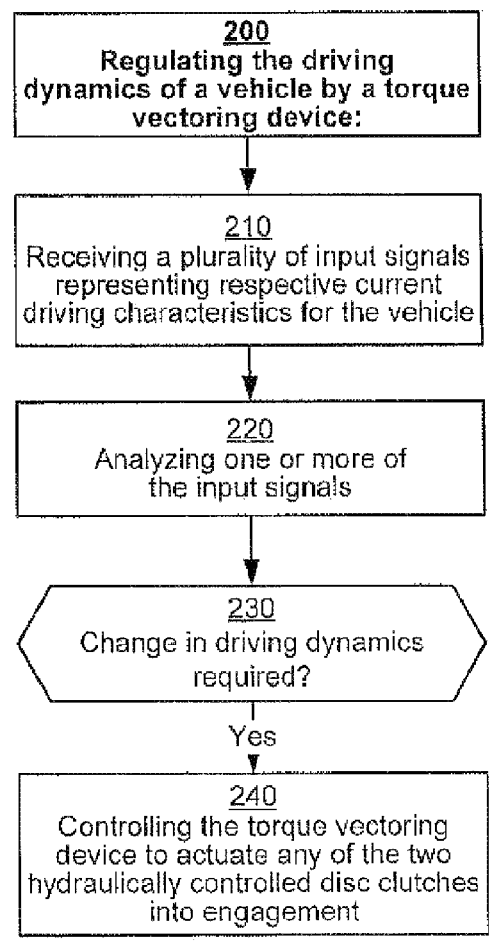
FIG. 6 is a flowchart diagram illustrating a method of regulating the driving dynamics of a vehicle by controlling a torque distribution from a vehicle engine between a first shaft and a second shaft of the vehicle.
Figure 7:
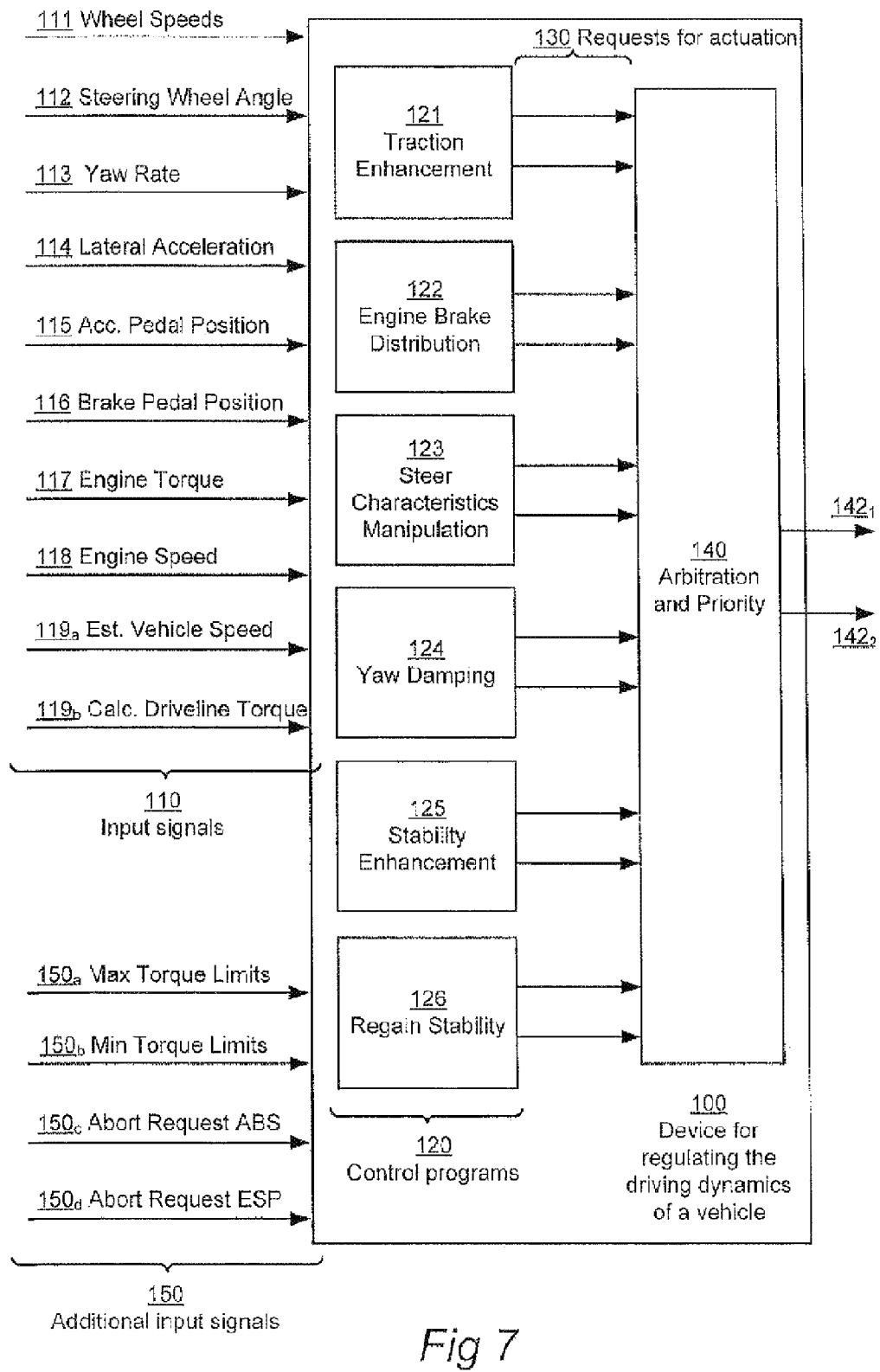
FIG. 7 is a block diagram illustrating a device for performing the method of FIG. 6.
Figure 1:
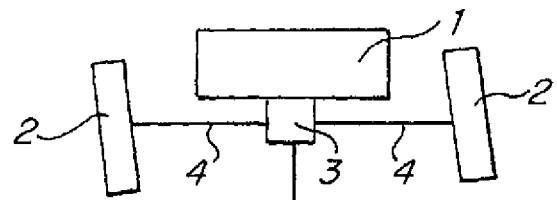
Figure 2:
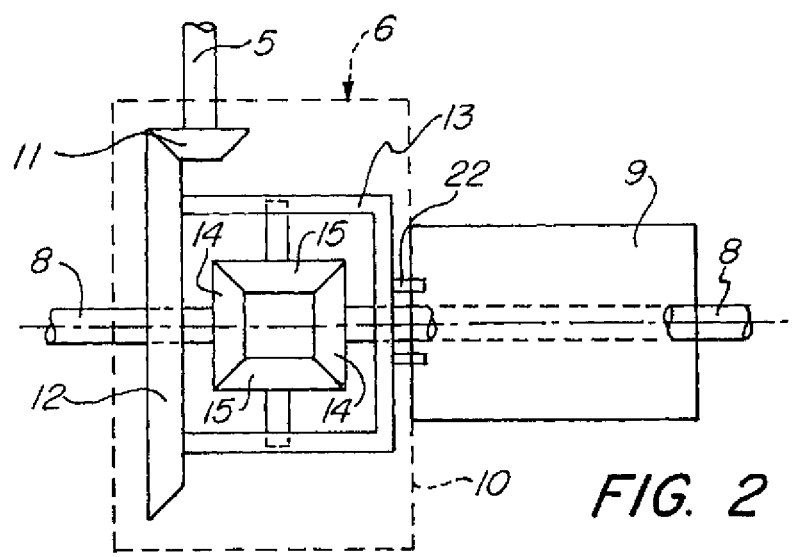

With reference to FIGS. 5-7, it will now be described how the torque vectoring device of FIGS. 1-4 can be controlled by a controller device, such as an electronic control unit (ECU), in order to regulate the driving dynamics of a vehicle. As seen in FIG. 5, a controller device 100 is operatively connected to the torque vectoring device 9 (which is only schematically indicated in FIG. 5). The controller device 100 is arranged to receive, at an input interface thereof, a plurality of input signals 110 representing respective current driving characteristics for the vehicle, to perform arithmetic and logic operations upon the received input parameters and to make appropriate decisions on control operations to be applied to the torque vectoring device 9 in order to obtain and maintain the desired driving dynamics of the vehicle at any given situation. To this end, the controller device 100 has been programmed with a plurality of rules and reference data which will assist in the decision making procedures. Whenever a decision is made to take an action to regulate the driving dynamics of the vehicle, control signals 142 are generated and supplied to actuators 56 and 57 of the two hydraulically controlled disc clutches 26 and 27, respectively, in the torque vectoring device 9.

In the illustrated embodiment, the controller device 100 is an electronic control unit (ECU), which is integrated with or firmly coupled to the torque vectoring device 9 and therefore has the dedicated task of controlling the torque vectoring device 9. In other embodiments, however, the controller device 100 may be implemented by another ECU which already exists in the vehicle for another purpose, such as an ECU for an anti-brake system (ABS) or an electronic stability program (ESP). In still other embodiments, the controller device 100 may be implemented by an application-specific integrated circuit (ASIC), a field-programmable gate array (FPGA), as another kind of programmable logic device, or as essentially any practical realization of software (program instructions) executed on an appropriate hardware.

The controller device 100 is thus configured to perform a method 200, which is illustrated on a general level in FIG. 6, of regulating the driving dynamics of the vehicle by controlling the torque distribution from the vehicle engine between a first shaft 101 and a second shaft 102 of the vehicle.

In embodiments where the torque vectoring device 9 is mounted between two wheels of the same drive shaft, as shown at 9 in FIG. 1, the first shaft 101 may be one half of the drive shaft 8 (for instance coupled to the rear left wheel), whereas the second shaft 102 may be the other half of the drive shaft 8 (for instance coupled to the rear right wheel). This is referred to as a transversal application in the following.

In other embodiments, where the torque vectoring device 9 is mounted between the front drive shaft 4 and the rear drive shaft 8, as indicated by a dashed box 9' in FIG. 1, the first shaft 101 may be one half of the cardan shaft 5, whereas the second shaft 102 may be the other half of the cardan shaft 5. This is referred to as a longitudinal application in the following.

Reference is now made to FIG. 6. The method 200 involves a first step 210 of receiving a plurality of input signals 110, each input signal representing a respective current driving characteristic for the vehicle. In a following step 220, one or more of the input signals 110 are analyzed so as to determine whether a change in the driving dynamics is required. It is then checked, in a step 230, whether a change in the driving dynamics is indeed required, and if the result of the check is in the affirmative, a step 240 is performed which involves controlling the torque vectoring device 9 of claim 1 to actuate any of the two hydraulically controlled disc clutches 26, 27 into its engaged condition by selectively generating a first control signal $142_1$ (FIG. 7) for actuation of the first hydraulically controlled disc clutch 26, a second control signal $142_2$ for actuation of the second hydraulically controlled disc clutch 27, or both. The generated first and/or second control signal $142_1$, $142_2$ is supplied to the respective actuator 56 or 57.

The method of FIG. 6 may be implemented as a computer program product comprising a computer readable medium, having thereon a computer program comprising program instructions, the computer program being loadable into a data-processing unit (such as ECU 100) and being adapted to cause the data-processing unit to execute the steps of the method when the computer program is run by the data-processing unit.

FIG. 7 is a block diagram illustrating an embodiment of the controller device 100 in more detail. The controller device 100 receives a plurality of input signals 110 representing respective current driving characteristics for the vehicle. In the disclosed embodiment, the input signals 110 include a wheel speeds signal 111, a steering wheel angle signal 112, a yaw rate signal 113, a lateral acceleration signal 114, an accelerator pedal position signal 115, a brake pedal position signal 116, an engine torque signal 117, an engine speed signal 118, an estimated vehicle speed signal $119_a$, and a calculated driveline torque signal $119_b$. Of these, input signals 111-118 represent "real" characteristics, as measured by various sensor equipment in the vehicle, whereas input signals $119_a$ and $119_b$ are calculated from the other input signals.

The controller device 100 has a plurality of control programs 120 for regulating the driving dynamics of the vehicle. Each control program is configured to individually analyze one or more of the input signals 110 so as to determine whether a change in the driving dynamics is required and to generate a request 130 for actuation of any of the two hydraulically controlled disc clutches 26, 27 of the torque vectoring device 9. In the disclosed embodiment, the control programs 120 include a traction enhancement program 121, an engine brake distribution program 122, a steer characteristics manipulation program 123, a yaw damping program 124, a stability enhancement program 125, and a regain stability program 126.

Since the control programs 120 may operate concurrently and individually, situations will occur where requests 130 from two or more control programs 120 are conflicting. Therefore, an arbitration and priority program 140 is provided. The arbitration and priority program 140 is configured to receive concurrent requests 130 for actuation from two or more of the control programs 120, receive one or more additional input signals 150, not included in said plurality of input signals 110, and—based on the received concurrent requests and additional input signals—prioritize among, combine or inhibit the received concurrent requests and either generate an ultimate request $142_1$, $142_2$ for actuation of any of the two hydraulically controlled disc clutches 26, 27, or refraining from generating such an ultimate request.

In the disclosed embodiment, the additional input signals 150 include one or more torque distribution control abort requests $150_c$, $150_d$ from one or more external control programs in the vehicle, such as an anti-brake system (ABS) or an electronic stability program (ESP). The additional input signals 150 also include at least one of a maximum torque transfer limit $150_a$ and a minimum torque transfer limit $150_b$ for the two hydraulically controlled disc clutches 26, 27 of the torque vectoring device 9.

The control programs 120 will now be described in some detail.

Traction Enhancement Program 121

For transversal applications (left to right wheel):

The control program 121 shall control the torque vectoring device 9 in such a way that drive torque is redirected to the wheel that has or supposedly has the best traction capability. The nominal rotational speed of the wheels must be monitored to make a correct control intervention. If a wheel is rotating faster than its nominal speed, then the rotational speed of that wheel shall be reduced within the slip control authority of the torque vectoring device 9. That is, if one of the wheels on the shaft where the torque vectoring device 9 is applied is rotating faster than its nominal rotational speed, the control program 121 shall demand an increase in lock torque for the clutch device 26 or 27, decreasing the rotational speed of that wheel. This will produce an increase of the drive torque of the opposite wheel at the same time as the drive torque will be reduced at the slipping wheel. In case both wheels on the shaft are considered to be running faster than their nominal speed, then the control program 121 shall demand a reduction of the lock torque of any of the applied clutch devices 26, 27.

For longitudinal applications (between front and rear shaft):

The control program 121 shall control the torque vectoring device 9 to increase torque distribution to the shaft having, or supposedly having, the best traction capability. The nominal rotational speed difference of the front and rear shaft must be monitored to make a correct control intervention. If the differential speed between the shaft becomes too high or too low compared to what is desired, this indicates a higher friction utilization at one of the shafts. The torque vectoring device 9 shall be used to control the differential speed between the shafts to achieve the same friction utilisation of both shafts. If the differential speed is too high, control program 121 shall firstly request a reduction of locking torque to the clutch device increasing the differential speed between the shafts and secondly request an increase of the locking torque of the clutch decreasing the differential speed between the shafts. The opposite is true for the case when the differential speed is too low. As this action is performed, the drive torque will be automatically distributed according to the optimum traction potential.

Input signals: The control program 121 uses the wheel speeds of the shaft where the device 9 is operating (in case of transversal application), wheel speeds of all four wheels (in case of longitudinal application), steering wheel angle and estimated vehicle speed.

Engine Brake Distribution Program 122

For transversal applications (left to right wheel):

The control program 122 shall control the torque vectoring device 9 in such way that engine brake torque is redirected to the wheel that has or supposedly has the best traction capability. The nominal rotational speed of the wheels must be monitored to make a correct control intervention. If a wheel is rotating slower than its nominal speed, then the rotational speed of that wheel shall be increased within the slip control authority of the torque vectoring device 9. That is: if one of the wheels on the shaft where the torque vectoring device 9 is applied is rotating slower than its nominal rotational speed, then the control program 122 shall demand an increase in lock torque for the clutch device increasing the rotational speed of that wheel. This will produce an increase of the drive torque at the under slipping wheel and at the same time decrease the drive torque at the opposite wheel. In case both wheels on the shaft are considered to be running slower than their nominal speed, then the control program 122 shall demand a reduction of the lock torque of any of the applied clutch devices of the torque vectoring device 9.

For longitudinal applications (between front and rear shaft):

The control program 122 shall control the torque vectoring device 9 to increase torque distribution to the shaft having or supposedly having the best traction capability. The nominal rotational speed difference of the front and rear shafts must be monitored to make a correct control intervention. If the differential speed between the shafts becomes too high or too low compared too what is desired, this indicates a higher friction utilization at one of the shafts. The torque vectoring device 9 shall be used to control the differential speed between the shafts to achieve the same friction utilization of both shafts. If the differential speed is too high the control program 122 shall firstly request a reduction of locking torque to the clutch device increasing the differential speed between the shafts and secondly request an increase of the locking torque of the clutch decreasing the differential speed between the shafts. The opposite is true for the case when the differential speed is too low. As this action is performed, the engine brake will be automatically distributed to the shaft having the best grip potential.

The software for engine brake enhancement will use: wheel speeds of the shaft where the device 9 is operating (in case of transversal application), wheel speeds for all four wheels (in case of longitudinal application), steering wheel angle, and estimated vehicle speed.

Steer Characteristics Manipulation Program 123

The objective to manipulate the vehicle steer characteristics or under steer gradient. The vehicle is basically set to from chassis set up characteristics and change in tire lateral force generation properties due to drive/brake torque transfer.

For transversal applications (left to right)

The control program 123 shall execute a torque distribution between left and right wheel to either increase or decrease the yaw rate in the cornering direction of the vehicle (decrease and increase under, steer respectively). To increase the yaw rate (decrease under steer), the yaw torque in the cornering direction of the vehicle shall be increased by the control program 123. The nominal speed difference between left and right wheel of the shaft shall be monitored. If the nominal speed difference is within the built-in slip range of the torque vectoring device 9, the control program 123 shall request an increase of the locking torque of the clutch device increasing the rotational speed of the outer wheel. Then a higher positive (driving) drive torque will be applied at the outer corner wheel, and a lower drive torque will be applied at the inner wheel. This increases the yaw torque in the cornering direction.

If it is desired to decrease the yaw rate (increase under steer), the opposite control shall take place. The control program 123 shall request a lock torque increase for the clutch device increasing the inner corner wheel speed. This is on condition that that the nominal speed difference for the drive situation is such that the inner wheel speed can be increased by the torque vectoring device 9. Then a yaw torque in the opposite direction of the cornering direction will be induced, and the yaw rate of the vehicle will decrease in absolute value.

For applications where the device is used between the axles (front to rear):

The control program 123 shall distribute torque between front and rear shafts to influence the cornering characteristics of the tires in order to achieve a change in steer characteristics and/or increase/decrease the yaw torque from tire longitudinal forces.

If the under steer shall be reduced, the control program 123 shall decrease the cornering stiffness of the rear tires by presenting a higher absolute value of longitudinal torque to the rear shaft. At the same time, the control program 123 shall evaluate the reduction in rear tire cornering stiffness against the front tires longitudinal force displacement in the yawing direction due to steering wheel angle. Also, front tire cornering stiffness change due to torque transfer shall be taken into the evaluation. The control program 123 shall estimate the torque distribution giving the highest yaw torque increase into the cornering direction of the vehicle and/or giving a robust control. The control program 123 shall increase locking torque to the clutch device executing a speed increase of the shaft that shall have an increased drive torque to achieve the desired torque distribution. To increase under steer, the opposite is true. Front tires lateral stiffness shall be reduced by presenting higher absolute values of longitudinal forces gain. The control program 123 shall take in to account the yaw torque induced from front shaft longitudinal force and steer angle and torque redistribution effect on rear tires cornering stiffness. The control program 123 shall increase locking torque of the clutch device corresponding to the desired torque redistribution giving the highest yaw torque reduction (in the cornering direction) and/or control robustness. The nominal speed difference between front and rear shafts shall be calculated, and if the speed difference is within the controllable range of the device 9, the action shall be performed.

The control program 123 for steer characteristics manipulation uses: wheel speeds, steering wheel angle, estimated vehicle speed, and driveline torque.

Yaw Damping Program 124

For transversal applications (left to right):

The control program 124 shall reduce yaw oscillatory behavior of the vehicle. The oscillatory behavior shall be reduced by reducing high vehicle yaw accelerations with respect to the steering wheel input. The nominal differential speed between the rear tires has to be calculated to perform the correct control. To reduce clockwise yaw accelerations, the control program 124 shall request increased locking torque to the clutch device increasing the rotational speed of the right wheel. Control action shall only be performed if the nominal left-right speed difference is such that the torque vectoring device 9 has control authority to increase the right wheel speed.

To reduce counter clockwise yaw accelerations, the control program 124 shall request increased locking torque to the clutch device increasing the rotational speed of the left wheel. Control action shall only be performed if the nominal left-right speed difference is such that the torque vectoring device 9 has control authority to increase the left wheel speed.

For longitudinal applications (between front and rear shafts):

The control program 124 shall reduce oscillatory behavior in the yaw rate of the vehicle. The oscillatory behavior shall be achieved by counteracting the differential speed occurring between the front and rear shafts at yaw rate increase. The nominal differential speed between front and rear shafts shall be calculated as base to perform the correct control action. The control program 124 shall request a locking torque increase of the clutch device counteracting the differential speed change due to yaw rate change. That is, if differential speed increases with yaw rate change, the torque vectoring device 9 shall request a locking torque to the clutch device acting to reduce the differential speed. If the differential speed will decrease with the yaw rate change, the control program 124 will request a locking torque to the clutch device increasing the differential speed. The control of the devices shall only be carried out if torque vectoring device control authority can execute the intended change in differential speed with respect to the calculated nominal speed difference.

The control program 124 for yaw damping enhancement will use: wheel speeds of the shaft where the device is operating (in case of transversal application), wheel speeds of all four wheels (in case of longitudinal application), steering wheel angle, estimated vehicle velocity, yaw rate, and lateral acceleration.

Stability Enhancement Program 125

Here, the objective is to increase vehicle stability. With increased vehicle stability control is meant actuating the device with the aim to increase the margin to over steer and under steer at different drive situations. The control program 125 shall detect drive situations likely to result in over or under steer and act pre-emptively to avoid the appearance of under steer over steer drive conditions.

For transversal applications (left to right):

The control program 125 shall control the torque vectoring device 9 to differentiate the torque applied at the left and right wheel in such way that the vehicle follows the driver steering wheel command as good as possible with or without respect to the utilizable ground friction.

When drive situations where the vehicle is prone to under steer are detected, the control program 125 shall increase the yaw torque in the direction of the intended cornering. To make the correct control intervention, the nominal speed difference between left and right wheels must be calculated. If it is found that the torque vectoring device 9 has authority at the drive situation to increase the rotational speed of the outer wheel, the control program 125 shall request an increased locking torque of the clutch device making the outer wheel rotate faster. More positive torque (driving) will then be transferred to the corner outer wheel, and at the same time less will be transferred to the inner corner wheel. This induces an additional yaw torque in the cornering direction of the vehicle.

When drive situations where the vehicle is prone to over steer are detected, the control program 125 shall decrease the yaw torque in the direction of the intended cornering. To make the correct control intervention, the nominal speed difference between left and right wheels must be calculated. If it is found that the torque vectoring device 9 has authority at the drive situation to increase the rotational speed of the inner wheel, the control program 125 shall request an increased locking torque of the clutch device making the inner corner wheel rotate faster. More positive (driving) torque will then be transferred to the inner wheel, and at the same time less will be transferred to the outer corner wheel. This induces a yaw torque opposite to the cornering direction of the vehicle.

For longitudinal applications (between front and rear axle):

The control program 125 shall control torque split between the front and rear shafts to modulate the yaw torque of the vehicle.

When drive situations where the vehicle is prone to under steer are detected, the control program 125 shall increase the yaw torque in the direction of the intended cornering.

To reduce under steer, the control program 125 shall decrease the cornering stiffness of the rear tires by presenting a higher absolute value of longitudinal torque to the rear shaft. At the same time the control program 125 shall evaluate the reduction in rear tire cornering stiffness against the front tires longitudinal force displacement in the yawing direction due to steering wheel angle. Also front tire cornering stiffness change due to torque transfer shall be taken into the evaluation. The control program 125 shall estimate the torque distribution giving the highest yaw torque increase into the cornering direction of the vehicle and/or giving a robust control. The control program 125 shall increase locking torque to the clutch device of the torque vectoring device 9 executing a speed increase of the shaft that shall have an increased drive torque to achieve the desired torque distribution.

In drive situations where over steer is likely to happen, the control program 125 shall decrease vehicle yaw torque in the direction of the intended cornering, i.e. increase vehicle under steer. Front tires lateral stiffness shall be reduced by presenting higher absolute values of longitudinal forces at the front tires. The control program 125 shall take into account the yaw torque induced from front shaft longitudinal force and steer angle. Also the torque redistribution effect on rear tires cornering stiffness shall be taken into account. The control program 125 shall increase locking torque of the clutch device of the torque vectoring device 9 corresponding to the desired torque redistribution giving the highest yaw torque reduction (in the cornering direction) and/or control robustness. The nominal speed difference between front and rear shafts shall be calculated, and if the speed difference in within the controllable range of the torque vectoring device 9, the action shall be performed.

The control program 125 for steer characteristics manipulation will use steering wheel angle, wheel speeds of the shaft where the device is operating (in case of transversal application), wheel speeds of all four wheels (in case of longitudinal application), estimated vehicle speed, driveline torque, accelerator pedal position, and lateral acceleration.

Regain Stability Program 126

Instability is when vehicle lateral dynamics deviate too much from the linear steer characteristics.

Transversal applications (left to right):

The control program 126 will actuate the device to execute a differentiation of the torque applied at the left and right wheel in such a way that unwanted over steer/under steer is reduced.

In case of too much under steer:

The control program 126 will try to increase yaw torque in the cornering direction of the vehicle. Monitoring of the nominal differential speed between the left and right wheels is required to make a successful intervention. If the nominal left-right differential speed over the shaft is such that the torque vectoring device 9 has the potential to increase the outer wheel speed, the control program 126 will increase the locking torque of the clutch device of the torque vectoring device 9 increasing the speed of the outer wheel. Driving torque transfer to the outer wheel will then increase, and torque transfer to the inner wheel will then decrease and achieve an increased yaw torque in the cornering direction. If the nominal speed left-right is higher than the built-in over-under slip authority of the torque vectoring device 9, then this control program will not demand any actuating pressure of any clutch device.

In case of too much over steer:

The control program 126 will try to induce a yaw torque in the opposite direction of the cornering direction. Also here is monitoring of the nominal differential speed left to right required to make a successful intervention. If the nominal differential speed over the shaft is such that the torque vectoring device 9 can increase the speed of the inner wheel, then the control program 126 will increase the locking torque of the clutch device increasing the inner speed. Driving torque will then increase on the inner wheel and decrease on the outer wheel and thus induce a yaw torque in the opposite direction from the cornering direction.

Longitudinal applications (between front and rear axle):

This implies the control program 126 actuating the device to execute a torque distribution between front and rear shafts aiming to remove unwanted over steer/under steer.

In case of too much under steer:

The control program 126 shall practice a principle of increasing the cornering stiffness of the front shaft and decrease the cornering stiffness of the rear shaft. The nominal speed between the front and rear shafts is necessary to monitor to make a correct intervention. If the nominal speed between the front and rear is within the over under-slip authority of the torque vectoring device 9, the control program 126 shall reduce driveline torque presented at the front shaft. In case of positive engine torque the control program 126 shall increase locking torque of the clutch increasing the rear shaft speed. Positive drive torque will then be transferred to the rear shaft and at the same time removed from the front shaft. In case of negative driveline torque (engine brake), the control program 126 shall increase the locking torque to the clutch device decreasing the rotational speed of the rear wheels. Negative drive torque will then be transferred to the rear shaft, and at the same time negative drive torque will be reduced at the front shaft. The limit for the locking torque activation is in both cases the available driveline torque (plus suitable margin) to achieve the intended cornering stiffness redistribution.

In case of too much over steer:

The control program 126 shall practice a principle of increasing the cornering stiffness of the rear shaft and decrease the cornering stiffness of the front shaft. The nominal speed between the front and rear shafts is necessary to monitor to make a correct intervention. If the nominal speed between the front and rear is within the speed increase authority of the torque vectoring device 9, the control program 126 shall reduce the driveline torque presented at the rear shaft. In case of positive engine torque, rear shaft torque shall be decreased by firstly reducing the lock torque to the clutch device increasing the rear shaft rotational speed and secondly increasing the locking torque of the clutch device decreasing the rotational speed of the front shaft. Positive drive torque will then be transferred to the front shaft and decreased at the rear shaft.

In case of negative driveline torque, rear shaft drive torque shall be increased by first reducing the locking torque to the clutch device decreasing rear shaft speed and then increasing the torque of the clutch decreasing the rear shaft torque. The limit for the locking torque activation is in both cases the available driveline torque (plus suitable margin) to achieve the intended cornering stiffness redistribution.

Input signals to the control program 126 for stability regaining are: driveline torque (in case of longitudinal installation), wheel speeds of the shaft where the device is operating (in case of transversal application), wheel speeds of all four wheels (in case of longitudinal application), estimated vehicle velocity, steering wheel angle, and yaw rate.

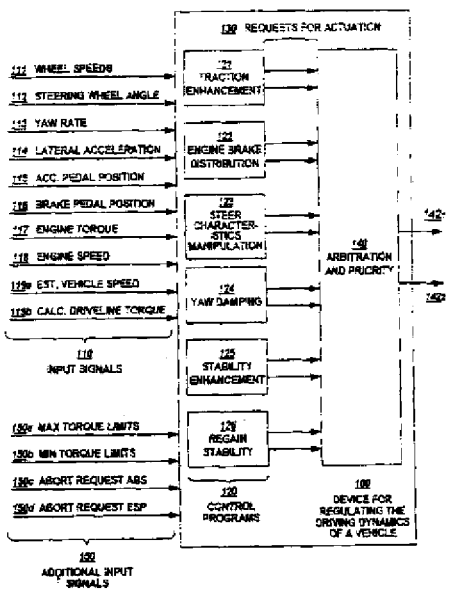

What is claimed is:

1. A torque vectoring device for selectively directing different torques to the two wheels of a drive axle on a vehicle, comprising:

two hydraulically controlled disc clutches, connected to a drive shaft that extends through the device, and wherein said clutches when in an engaged condition connect the drive shaft to either of two gear sleeves, each in splines engagement with an eccentric tube eccentrically journaled in relation to the drive shaft, and a torque transmitting mechanism with a gear ratio of 1:1 between the eccentric tube and a differential case sleeve, coaxial with the drive shaft and forming part of a differential case of a differential on the drive axle, to which differential the torque vectoring device is connected;

wherein a disc clutch low of said two hydraulically controlled disc clutches is adapted to obtain a rotational speed reduction for the drive shaft and is connected to a gear sleeve low in splines engagement with an outer periphery of the eccentric tube;

wherein a disc clutch high of said two hydraulically controlled disc clutches is adapted to obtain a rotational speed increase for the drive shaft and is connected to a gear sleeve high in splines engagement with an inner periphery of the eccentric tube;

wherein the disc clutches are arranged on a hub in splines engagement with the drive shaft; and wherein the torque transmitting mechanism comprises alternate discs, namely outer discs in external gear engagement with internal gear teeth in the eccentric tube and inner discs in internal gear engagement with external gear teeth on the differential case sleeve, and pins in corresponding holes in the discs for connecting the discs.

2. The device according to claim 1, wherein the hub is provided with reaction washers for the disc clutches.

3. The device according to claim 1, wherein each disc clutch, comprising alternate clutch discs, can be controlled by hydraulic fluid admitted to a cylinder space in a housing of the device and acting on a piston and further on the clutch via an axial bearing.

4. The device according to claim 1, wherein the gear sleeve low is journaled in a housing of the device by means of a radial bearing.

5. The device according to claim 1, wherein the gear sleeve high is journaled on the differential case sleeve by means of a radial bearing.

6. The device according to claim 1, wherein the eccentric tube is journaled in a housing of the device by means of radial bearings.

7. A method of regulating the driving dynamics of a vehicle by controlling a torque distribution from a vehicle engine between a first shaft and a second shaft of the vehicle, the method involving: receiving, at a data processing unit, a plurality of input signals, each input signal representing a respective current driving characteristic for said vehicle; analyzing, via software executing on the data processing unit, one or more of said input signals so as to determine whether a change in the driving dynamics is required; and when it is determined that a change in the driving dynamics is required, controlling the torque vectoring device of claim 1 to actuate any of said two hydraulically controlled disc clutches into its engaged condition.

8. The method according to claim 7, wherein the step of controlling involves selectively generating a first control signal for actuation of a first one of said two hydraulically controlled disc clutches and/or a second control signal for actuation of a second one of said two hydraulically controlled disc clutches.

9. The method according to claim 7, further involving: providing a plurality of control programs for regulating the driving dynamics of the vehicle, each control program being configured to individually analyze one or more of said input signals so as to determine whether a change in the driving dynamics is required and to generate a request for actuation of any of said two hydraulically controlled disc clutches of said torque vectoring device.

10. The method according to claim 9, further involving: providing an arbitration and priority program configured to: receive concurrent requests for actuation from two or more of said control programs; receive one or more additional input signals, not included in said plurality of input signals; and based on the received concurrent requests and additional input signals, prioritize among, combine or inhibit the received concurrent requests and either generate an ultimate request for actuation of any of said two hydraulically controlled disc clutches, or refraining from generating such an ultimate request.

11. The method according to claim 10, wherein said additional input signals include one or more torque distribution control abort requests from one or more external control programs in said vehicle, such as an anti-brake system or an electronic stability program.

12. The method according to claim 9, wherein said additional input signals include at least one of a maximum torque transfer limit and a minimum torque transfer limit for said two hydraulically controlled disc clutches of said torque vectoring device.

13. The method according to claim 9, wherein said plurality of control programs include two or more programs selected from the group consisting of: a traction enhancement program; an engine brake distribution program; a steer characteristics manipulation program; a yaw damping program; a stability enhancement program; and a regain stability program.

14. The method according to claim 7, wherein said plurality of input signals include two or more signals selected from the group consisting of: a wheel speeds signal; a steering wheel angle signal; a yaw rate signal; a lateral acceleration signal; an accelerator pedal position signal; a brake pedal position signal; an engine torque signal; an engine speed signal; an estimated vehicle speed signal; and a calculated driveline torque signal.

15. A computer program product comprising a non-transitory computer readable medium, having thereon a computer program comprising program instructions, the computer program being loadable into the data-processing unit and being adapted to cause the data-processing unit to execute the steps according to claim 7 when the computer program is run by the data-processing unit.

16. A device for regulating the driving dynamics of a vehicle by controlling a torque distribution from a vehicle engine between a first shaft and a second shaft of the vehicle, the device comprising: a data processing unit; an input interface for receiving a plurality of input signals, each input signal representing a respective current driving characteristic for said vehicle; a first software code executing on said data processing unit for analyzing one or more of said input signals so as to determine whether a change in the driving dynamics is required; and a second software code executing on said data processing unit for requesting that the torque vectoring device of claim 1 actuate any of said two hydraulically controlled disc clutches into its engaged condition in response to said first software code determining that a change in the driving dynamics is required.

* * * * *

UNITED STATES PATENT AND TRADEMARK OFFICE
CERTIFICATE OF CORRECTION

PATENT NO.       : 8,296,022 B2                      Page 1 of 7
APPLICATION NO.  : 12/904811
DATED            : October 23, 2012
INVENTOR(S)      : Lars Severinsson et al.

It is certified that error appears in the above-identified patent and that said Letters Patent is hereby corrected as shown below:

The title page should be deleted to appear as per attached title page.

The sheets of drawings consisting of Figures 1-7 should be deleted to appear as per attached Figures 1-7.

Signed and Sealed this
Twenty-fourth Day of September, 2013

Teresa Stanek Rea
*Deputy Director of the United States Patent and Trademark Office*

(12) United States Patent (10) Patent No.: US 8,296,022 B2
Severinsson et al. (45) Date of Patent: Oct. 23, 2012

(54) TORQUE VECTORING DEVICE AND MEANS FOR ITS CONTROL

(75) Inventors: Lars Severinsson, Hishult (SE); Ola Nicklasson, Mörarp (SE)

(73) Assignee: BorgWarner TorqTransfer Systems AB (SE)

( * ) Notice: Subject to any disclaimer, the term of this patent is extended or adjusted under 35 U.S.C. 154(b) by 0 days.

(21) Appl. No.: 12/904,811

(22) Filed: Oct. 14, 2010

(65) Prior Publication Data

US 2011/0087409 A1 Apr. 14, 2011

Related U.S. Application Data

(63) Continuation of application No. PCT/SE2009/050411, filed on Apr. 22, 2009.

(30) Foreign Application Priority Data

Apr. 24, 2008 (SE) .................................. 0800946

(51) Int. Cl.
*G06F 7/00* (2006.01)
(52) U.S. Cl. ...................... 701/58; 701/51; 475/205
(58) Field of Classification Search .............. 701/51, 701/58; 475/86, 205; 180/233, 247, 248
See application file for complete search history.

(56) References Cited

U.S. PATENT DOCUMENTS

| | | | |
|---|---|---|---|
| 5,086,867 A | 2/1992 | Hirota et al. | |
| 7,294,083 B2 * | 11/2007 | Bowen | 475/225 |
| 7,361,113 B2 * | 4/2008 | Puiu et al. | 475/221 |
| 7,503,416 B2 * | 3/2009 | Sharma et al. | 180/247 |
| 7,708,665 B2 * | 5/2010 | Wheals | 475/205 |
| 7,806,220 B2 * | 10/2010 | Sharma et al. | 180/247 |
| 2005/0261099 A1 * | 11/2005 | Bowen | 475/205 |
| 2006/0122024 A1 * | 6/2006 | Bowen | 475/205 |
| 2006/0157291 A1 * | 7/2006 | Puiu et al. | 180/247 |
| 2006/0162980 A1 * | 7/2006 | Bowen | 180/247 |
| 2006/0276292 A1 * | 12/2006 | Puiu | 475/205 |
| 2008/0242463 A1 * | 10/2008 | Yamada et al. | 475/5 |
| 2008/0287246 A1 | 11/2008 | Sackl et al. | |
| 2009/0131210 A1 | 5/2009 | Kassler | |
| 2009/0192006 A1 * | 7/2009 | Bock et al. | 475/205 |

(Continued)

FOREIGN PATENT DOCUMENTS

AT 8859 U1 1/2007

(Continued)

OTHER PUBLICATIONS

International Search Report and Written Opinion of the International Searching Authority; PCT/SE2009/050411; Jul. 9, 2009; 8 pages.

(Continued)

*Primary Examiner* — Helal A Algahaim
(74) *Attorney, Agent, or Firm* — St. Onge Steward Johnston & Reens LLC

(57) ABSTRACT

A torque vectoring device directs different torques at will to the two wheels of a drive axle on a road vehicle. It has two hydraulically controlled disc clutches, connected to a drive shaft, extending through the device, and in engaged condition intended for connecting the drive shaft to either of two gear sleeves, each in splines engagement with an eccentric tube eccentrically journaled in relation to the drive shaft, and a torque transmitting mechanism with a gear ratio of 1:1 between the eccentric tube and a differential case sleeve, coaxial with the drive shaft and forming part of a differential case of a differential on the drive axle, to which differential the torque vectoring device is connected.

16 Claims, 5 Drawing Sheets